United States Patent
Tanno

(10) Patent No.: US 9,768,452 B2
(45) Date of Patent: Sep. 19, 2017

(54) FUEL CELL SEPARATOR

(71) Applicant: Nisshinbo Chemical Inc., Tokyo (JP)

(72) Inventor: Fumio Tanno, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 72 days.

(21) Appl. No.: 14/762,036

(22) PCT Filed: Jan. 9, 2014

(86) PCT No.: PCT/JP2014/050216
§ 371 (c)(1),
(2) Date: Jul. 20, 2015

(87) PCT Pub. No.: WO2014/129224
PCT Pub. Date: Aug. 28, 2014

(65) Prior Publication Data
US 2015/0340713 A1 Nov. 26, 2015

(30) Foreign Application Priority Data

Feb. 25, 2013 (JP) .................................. 2013-034629

(51) Int. Cl.
| | | |
|---|---|---|
| *H01M 8/0226* | (2016.01) | |
| *H01M 8/0221* | (2016.01) | |
| *H01M 8/0258* | (2016.01) | |
| *H01M 8/0213* | (2016.01) | |
| *H01M 8/1018* | (2016.01) | |

(52) U.S. Cl.
CPC ....... *H01M 8/0221* (2013.01); *H01M 8/0213* (2013.01); *H01M 8/0226* (2013.01); *H01M 8/0258* (2013.01); *H01M 2008/1095* (2013.01); Y02P 70/56 (2015.11)

(58) Field of Classification Search
CPC ...................................................... H01M 8/02
USPC ................................................ 429/400–535
See application file for complete search history.

(56) References Cited

U.S. PATENT DOCUMENTS

| | | |
|---|---|---|
| 7,960,065 B2 | 6/2011 | Hamada et al. |
| 2005/0287415 A1 | 12/2005 | Hatoh et al. |
| 2006/0257713 A1* | 11/2006 | Elhamid ............. H01M 8/0206 429/483 |
| 2006/0263670 A1 | 11/2006 | Tanno |
| 2010/0099000 A1 | 4/2010 | Kanba et al. |
| 2013/0171547 A1 | 7/2013 | Tanno |

FOREIGN PATENT DOCUMENTS

| | | |
|---|---|---|
| JP | 2004-335121 A | 11/2004 |
| JP | 2006-331673 A | 12/2006 |
| JP | 2011-60667 A | 3/2011 |
| JP | 2011-76989 A | 4/2011 |
| WO | 2005/117180 A1 | 12/2005 |
| WO | 2007/018185 A1 | 2/2007 |
| WO | 2012/032922 A1 | 3/2012 |

OTHER PUBLICATIONS

International Search Report dated Apr. 8, 2014, issued in counterpart application No. PCT/JP2014/050216 (2 pages).
Office Action dated Apr. 13, 2016, issued in counterpart Canadian Patent Application No. 2,900,323. (4 pages).

\* cited by examiner

*Primary Examiner* — James Lee
(74) *Attorney, Agent, or Firm* — Westerman, Hattori, Daniels & Adrian, LLP

(57) ABSTRACT

A fuel cell separator obtained by: roughening the surface of a compact formed by molding a composition containing graphite powder, an epoxy resin, and a phenol resin; treating the compact with infrared laser irradiation; and then performing a hydrophilizing treatment, wherein a fuel cell separator is provided having the characteristics that (1) the initial static contact angle is no greater than 20°, and (2) after manufacture, the static contact angle after being stored in atmospheric air for 3000 hours is no greater than 30°. This fuel cell separator has high hydrophilicity, allowing water generated during the electrical generation of the fuel cell to be easily discharged, and the hydrophilicity is maintained over a long period of time.

12 Claims, No Drawings

FUEL CELL SEPARATOR

TECHNICAL FIELD

The present invention relates to a fuel cell separator.

BACKGROUND ART

Fuel cell separators, along with carrying out the roles of imparting electrical conductivity to each unit cell and of securing flow channels for the fuel and air (oxygen) supplied to the unit cells, also serve as boundary walls separating the unit cells. Characteristics required of a separator thus include a high electrical conductivity, a high impermeability to gases, chemical stability, heat resistance and hydrophilicity. Of these characteristics, techniques known for increasing the hydrophilicity include the methods disclosed in Patent Documents 1 to 4.

Patent Documents 1 and 2 disclose methods of hydrophilizing the surface of a fuel cell separator by treatment with fluorine gas or $SO_3$ gas. The static contact angle of these separators is initially 20°, indicating good hydrophilicity. However, after 2,000 hours of immersion in hot water at 90° C., the static contact angle rises to 35°, Hence, a problem with these methods is that the hydrophilicity is not maintained.

Patent Document 3 discloses a method of hydrophilizing the surface of a fuel cell separator by roughening the surface, then subjecting it to atmospheric-pressure plasma treatment. The contact angle of this separator is 20° immediately after production, indicating a good hydrophilicity. However, the contact angle following one month of atmospheric storage rises to 67° and so, here too, the hydrophilicity is not maintained.

Moreover, in the fuel cell separators obtained by the methods disclosed in Patent Documents 1 to 3, the hydrophilicity decreases on account of contamination of the separator surface owing to the bleed-out of binder component low-molecular-weight ingredients and of mold release agent at the separator surface.

Patent Document 4 discloses a method of hydrophilizing the surface of a fuel cell separator by infrared laser irradiation. Because the binder component at the separator surface has been removed, there is no separator contamination due to the bleed-out of low-molecular-weight ingredients within the binder component and of mold release agent. However, the initial contact angle is 30° or more, and so the hydrophilicity is inadequate.

CITATION LIST

Patent Documents

Patent Document 1: JP-A 2011-060667
Patent Document 2: JP-A 2011-076989
Patent Document 3: JP-A 2006-331673
Patent Document 4: WO 2012/032922

SUMMARY OF INVENTION

Technical Problem

It is therefore an object of the invention to provide a fuel cell separator which has a high hydrophilicity and maintains that hydrophilicity for a long time.

Solution to Problem

The inventor, having conducted extensive investigations in order to attain the above object, has discovered as a result that a fuel cell separator obtained by subjecting the surface of an article molded from a composition containing a graphite powder, an epoxy resin and a phenolic resin to roughening treatment, followed by infrared laser irradiation treatment and, additionally, hydrophilizing treatment, has a high hydrophilicity and maintains that hydrophilicity for a long time.

Accordingly, the invention provides:

1. A fuel cell separator obtained by subjecting a surface of an article molded from a composition that includes a graphite powder, an epoxy resin and a phenolic resin to roughening treatment, followed by infrared laser irradiation treatment and, additionally, hydrophilizing treatment, wherein the fuel cell separator possesses characteristics (1) and (2) below:

(1) an initial static contact angle of 20° or less; and (2) a static contact angle after 3,000 hours of atmospheric storage following production of 30° or less.

2. The fuel cell separator according to 1 above, further possessing characteristic (3) below:

(3) a static contact angle after 10,000 hours of immersion in 90° C. ion-exchanged water of 30° or less.

3. The fuel cell separator according to 1 or 2 above, wherein the hydrophilizing treatment is sulfur trioxide gas treatment, fluorine gas treatment, vacuum plasma treatment or atmospheric-pressure plasma treatment.

4. The fuel cell separator according to any one of 1 to 3 above, wherein the roughening treatment is blasting, barrel polishing or brush polishing.

Advantageous Effects of Invention

The fuel cell separator of the invention has a high hydrophilicity which enables water produced by fuel cell power generation to be easily drained, and moreover maintains such hydrophilicity for a long time. Fuel cells provided with the fuel cell separator of the invention are thus able to maintain a stable power generation efficiency over a long period of time.

DESCRIPTION OF EMBODIMENTS

The fuel cell separator of the invention is obtained by subjecting a surface of an article molded from a composition that includes a graphite powder, an epoxy resin and a phenolic resin (which composition is referred to below as the "fuel cell separator composition") to roughening treatment, followed by infrared laser irradiation treatment and, additionally, hydrophilizing treatment.

The graphite powder is exemplified by graphite powders of, e.g., natural graphite, synthetic graphite obtained by firing needle coke, and synthetic graphite obtained by firing lump coke. Such graphite powders may be of one type used alone, or may be of two or more types used in combination. These graphite powders may have mixed therein carbon material powders such as ground electrodes, coal pitch, petroleum pitch, coke, activated carbon, glassy carbon, acetylene black, ketjen black, carbon nanotubes or graphene.

The mean particle size $d_{50}$ of the graphite powder is not particularly limited. However, from the standpoint of maintaining voids between the graphite particles at a suitable level, making the surface area of contact between graphite particles larger and increasing the electrical conductivity (decreasing the contact resistance) by suppressing the formation of surface irregularities following resin removal, the mean particle size is preferably from 10 to 130 µm, more preferably from 20 to 110 µm, even more preferably from 20 to 70 µm, and still more preferably from 30 to 60 µm. At a graphite particle mean particle size $d_{50}$ of 10 µm or more, when the molded article has been irradiated with an infrared laser, resin is removed from the surface layer of the molded article, enabling the electrical conductivity at the separator surface to be increased; at the same time, the surface area of contact between graphite particles at the separator interior is fully maintained, making it possible to improve the electrical conductivity in the thickness direction of the separator as well. At a mean particle size of 130 µm or less, voids between the graphite particles are kept at a suitable level and so even when the resin that has been filled into the voids between the graphite particles on the separator surface is removed by laser irradiation, large irregularities do not form on the separator surface. As a result, the contact resistance at the separator surface is low and the electrical conductivity of the separator itself does not worsen.

Moreover, at a mean particle size $d_{50}$ of from 10 to 130 µm, by subjecting the molded article to infrared laser irradiation and thereby removing the resin between the graphite particles in the surface layer thereof, the molded article can be rendered into a separator having an excellent hydrophilicity and also a low contact resistance.

To increase even further the hydrophilicity-improving effect and the contact resistance-decreasing effect in the fuel cell separator of the invention, when the mean particle size $d_{50}$ of the graphite powder used is in the range of 10 to 130 µm, it is more preferable for the content of fine powder having a particle size of 5 µm or less in the graphite powder to be 5 wt % or less and for the content of coarse powder having a particle size of 200 µm or more to be 3 wt % or less. If the mean particle size $d_{50}$ is in the range of 30 to 60 µm, it is even more preferable for the content of fine powder having a particle size of 5 µm or less in the graphite powder to be 3 wt % or less and for the content of coarse powder having a particle size of 200 µm or more to be 1 wt % or less.

The mean particle size $d_{50}$ in this invention refers to the median diameter in particle size analysis by the laser diffraction method.

The epoxy resin is not subject to any particular limitation, so long as it is a resin having epoxy groups. Illustrative examples include o-cresol novolak-type epoxy resins, phenol novolak-type epoxy resins, bisphenol A-type epoxy resins, bisphenol F-type epoxy resins, biphenyl-type epoxy resins, biphenyl-aralkyl type epoxy resins, trisphenol-type epoxy resins, brominated epoxy resins and dicyclopentadiene-type epoxy resins. Of these, o-cresol novolak-type epoxy resins and phenol novolak-type epoxy resins are preferred; o-cresol novolak-type epoxy resins are more preferred.

To further increase the heat resistance of the resulting fuel cell separator, the epoxy resin has an epoxy equivalent weight of preferably from 158 to 800 g/eq, more preferably from 185 to 450 g/eq, and even more preferably from 190 to 200 g/eq.

In addition, to further increase the heat resistance of the resulting fuel cell separator and to provide also a good molding processability, the ICI viscosity of the epoxy resin at 150° C. is preferably from 0.01 to 5.8 Pa·s, more preferably from 0.17 to 1.2 Pa·s, and still more preferably from 0.24 to 0.70 Pa·s. By using an epoxy resin having an ICI viscosity in this range, the molecular weight of the resin is appropriate, the resulting fuel cell separator has a good heat resistance and the resin flow properties are good, thereby making it possible to lower the molding pressure and otherwise improve the molding processability.

Examples of phenolic resins include novolak-type phenolic resins, cresol-type phenolic resins, alkyl-modified phenolic resins, biphenyl aralkyl-type epoxy resins and trisphenol-type epoxy resins. These may be used singly or two or more may be used in combination.

In the fuel cell separator of the invention, the phenolic resin acts as a curing agent for the epoxy resin. The hydroxyl equivalent weight of the phenolic resin is not particularly limited, although to further increase the heat resistance of the resulting separator, the hydroxyl equivalent weight is preferably from 95 to 240 g/eq, and more preferably from 103 to 115 g/eq.

In addition, to further increase the heat resistance of the resulting fuel cell separator and to provide a good molding processability, the ICI viscosity of the phenolic resin at 150° C. is preferably from 0.02 to 0.7 Pa·s, more preferably from 0.20 to 0.60 Pa·s, and still more preferably from 0.30 to 0.50 Pa·s. By using a phenolic resin having an ICI viscosity in this range, the molecular weight of the resin is appropriate, the resulting fuel cell separator has a good heat resistance and the resin flow properties are good, thereby making it possible to lower the molding pressure and otherwise improve the molding processability.

The composition of the invention preferably further includes a curing accelerator and an internal mold release agent. The curing accelerator is not particularly limited, so long as it accelerates the reaction of epoxy groups with the curing agent. Illustrative examples include triphenylphosphine, tetraphenylphosphine, diazabicycloundecene, dimethylbenzylamine, 2-methylimidazole, 2-methyl-4-imidazole, 2-phenylimidazole, 2-phenyl-4-methylimidazole, 2-undecylimidazole and 2-heptadecylimidazole. These may be used singly or two or more may be used in combination.

The internal mold release agent also is not particularly limited, and is exemplified by internal mold release agents that have hitherto been used in the production of separators. Illustrative examples include stearic acid wax, amide waxes, montanic acid wax, carnauba wax and polyethylene waxes. These may be used singly or two or more may be used in combination.

The combined content of epoxy resin and phenolic resin in the fuel cell separator composition is not particularly limited, but is preferably from 10 to 30 parts by weight, and more preferably from 15 to 25 parts by weight, per 100 parts by weight of graphite powder.

The content of internal mold release agent in the fuel cell separator composition, although not particularly limited, is preferably from 0.1 to 1.5 parts by weight, and especially from 0.3 to 1.0 part by weight, per 100 parts by weight of graphite powder. An internal mold release agent content of less than 0.1 part by weight may lead to poor mold release, whereas a content in excess of 1.5 parts by weight may hinder curing of the resins and lead to other problems as well.

In the fuel cell separator composition, the epoxy resin, the phenolic resin and the curing accelerator together make up the binder component. Here, it is preferable to include from 0.5 to 1.2 parts by weight of curing accelerator per 100 parts by weight of a mixture of the epoxy resin and the phenolic resin. When less than 0.5 part by weight of curing accelerator is included, the binder component curing reaction may become slower or fail to proceed to a sufficient degree. On the other hand, at more than 1.2 parts by weight, the binder component curing reaction may become overly sensitive, possibly shortening the pot life.

The phenolic resin is included in an amount which is preferably from 0.98 to 1.02 hydroxyl equivalents per equivalent of the epoxy resin. At an amount of phenolic resin which is less than 0.98 hydroxyl equivalent, unreacted epoxy resin remains, which may result in the unreacted ingredients leaching out during power generation. At an amount which is more than 1.02 hydroxyl equivalents, unreacted phenolic resin remains, which may likewise result in unreacted ingredients leaching out during power generation.

The fuel cell separator composition may be prepared by, for example, mixing together the binder component, the graphite powder and the internal mold release agent in any order and in specific proportions. The mixer used at this time may be, for example, a planetary mixer, a ribbon blender, a Loedige mixer, a Henschel mixer, a rocking mixer or a Nauta mixer.

The fuel cell separator of the invention is obtained by molding a fuel cell separator composition, then subjecting the surface of the resulting molded article to roughening treatment, infrared laser irradiation treatment and hydrophilizing treatment. Various hitherto known processes may be used to prepare the composition and to mold the molded article.

The process used to mold the molded article may be, for example, injection molding, transfer molding, compression molding, extrusion molding, or sheet molding. When using a mold during molding, it is desirable to use a mold for the production of fuel cell separators which is capable of forming, on one or both sides at the surface of the molded article, grooves to serve as flow channels for the supply and removal of gases.

Roughening treatment on the molded article may be carried out by blasting such as air blasting or wet blasting, or by polishing such as barrel polishing or brush polishing. Blasting is preferred, and wet blasting is more preferred. The degree of roughening is not particularly limited, although taking into account the infrared laser irradiation treatment in the next step, roughening to an arithmetic mean roughness Ra of from 0.2 to 1.2 μm, a roughness curve element mean length RSm of from 100 to 200 μm, and a mean interval S between local peaks of 20 to 80 μm is preferred.

In cases where Ra, RSm and S are smaller than the lower limits, because a large amount of the binder component or molding release agent remains in the surface layer of the molded article, when this surface is irradiated with an infrared laser, a large amount of soot is generated, which may contaminate the molded article and the laser system. On the other hand, in cases where Ra, RS, and S are larger than the upper limits, the irregularities in the surface layer are large, as a result of which, when this surface layer is irradiated with an infrared laser, the laser light scatters, which may make sufficient irradiation impossible.

Examples of the laser used in infrared laser irradiation treatment include, without particular limitation, YAG lasers, carbon dioxide lasers, dye lasers and semiconductor lasers. From the standpoint of focal depth, convergence and oscillator life, a fiber laser is preferred. The wavelength of the infrared laser, although not particularly limited, is preferably from 780 to 10,600 nm, more preferably from 808 to 1,095 nm, and even more preferably from 920 to 1,070 nm.

The pulse energy of the infrared laser is preferably from 5 to 30 mJ, more preferably from 5 to 20 mJ, even more preferably from 7 to 15 mJ, and still more preferably from 10 to 12 mJ. At a pulse energy of less than 5 mJ, the removal of resin ingredients from the surface layer of the separator is inadequate, which may lead to declines in the hydrophilicity and electrical conductivity. On the other hand, at a pulse energy greater than 30 mJ, the separator heats up during processing, giving rise to warping, as a result of which the contact resistance may increase.

The spot diameter of the infrared laser is preferably from 50 to 800 μm, more preferably from 100 to 700 μm, even more preferably from 200 to 600 μm, and still more preferably from 300 to 500 μm. If the laser spot diameter is less than 50 μm, the power density becomes excessive and the separator heats up during processing, giving rise to warping, as a result of which the contact resistance may increase. On the other hand, if this exceeds 800 μm, the power density becomes low and the removal of resin ingredients from the separator surface layer is inadequate, which may lead to declines in the hydrophilicity and electrical conductivity.

The infrared laser overlap ratio is preferably from 5 to 50%, more preferably from 10 to 40%, and even more preferably from 20 to 30%. At an overlap ratio of less than 5%, the removal of resin from the surface layer of the separator is inadequate, as a result of which the electrical conductivity and hydrophilicity may decline. On the other hand, at an overlap ratio of more than 50%, the irradiated areas may become deeply eroded.

The hydrophilizing treatment is not particularly limited, although sulfur trioxide gas treatment, fluorine gas treatment and plasma treatment are preferred in this invention.

The method of hydrophilizing by sulfur trioxide gas treatment may be a known method, illustrative examples of which include methods that bring the separator material into contact with a gas containing, e.g., sulfuric anhydride gas or fuming sulfuric acid gas. Of these, the method of bringing the separator material into contact with a gas containing sulfuric anhydride gas is preferred in that the reactivity with the base material is high.

The method of hydrophilizing by fluorine gas treatment may be a known method, illustrative examples of which include methods of modifying the surface of the separator by bringing it into contact with fluorine gas or with a mixed gas containing fluorine gas. The mixed gas is exemplified by mixed gases of fluorine gas with an inert gas and/or oxygen gas. Examples of the inert gases include nitrogen gas and argon gas.

The method of hydrophilizing by plasma treatment may be a known method, illustrative examples of which include vacuum plasma treatment and atmospheric-pressure plasma treatment. Of these, the equipment for atmospheric-pressure plasma treatment is simple and productivity is good. Remote-type atmospheric-pressure glow discharge plasma treatment is especially preferred.

The gas used to form a plasma is exemplified by oxygen atom-containing oxygen gas, ozone gas and water, nitrogen atom-containing nitrogen gas and ammonia gas, and sulfur atom-containing sulfur dioxide gas and sulfur trioxide gas. The use of air is also possible. By carrying out plasma treatment using these gases, hydrophilic functional groups such as carbonyl groups, hydroxyl groups, amino groups and sulfo groups are introduced onto the surface of the molded article, enabling hydrophilicity to be imparted to the surface. Of these, a gas containing 80 vol % or more of nitrogen gas is preferred. A gas having a nitrogen gas content of 80 vol % or more with the remainder being oxygen gas is more preferred.

In the fuel cell separator of the invention, the respective surface treatments—that is, roughening treatment, infrared laser irradiation treatment and hydrophilizing treatment—should be carried out on at least the gas flow channel faces that come into contact with the water that forms during power generation, and may be carried out on all surfaces of the separator. In cases where surface treatment is carried out only on the gas flow channel faces, those sites that do not require surface treatment are masked. The masking materials and masking method used in such cases may be suitably selected from known materials and methods.

The inventive fuel cell separator obtained in this way has the characteristics of: (1) an initial static contact angle of 20° or less; and (2) a static contact angle after 3,000 hours of atmospheric storage following production of 30° or less. Here, "initial static contact angle" refers to the static contact angle measured one hour after production. Also, in this invention, "atmospheric" storage refers to storage in an environment at atmospheric pressure, a temperature of 25° C. and 50% relative humidity.

The fuel cell separator of the invention preferably has also the further characteristic of: (3) a static contact angle after 10,000 hours of immersion in 90° C. ion-exchanged water, under the condition that ion-exchanged water:separator=9:1 (weight ratio), of 30° or less.

Also, from the standpoint of electrical conductivity, the fuel cell separator of the invention preferably has a contact resistance of 10 m$\Omega \cdot cm^2$ or less.

Because the fuel cell separator of the invention has a high hydrophilicity and maintains that hydrophilicity for a long time, fuel cells provided with this separator are able to maintain a stable power generation efficiency for a long time. The inventive fuel cell separator having such properties is especially well-suited for use as a separator in polymer electrolyte fuel cells.

A polymer electrolyte fuel cell is generally composed of a stack of many unit cells, each unit cell being constructed of a solid polymer membrane disposed between a pair of electrodes that are in turn sandwiched between a pair of separators which form flow channels for the supply and removal of gases. The fuel cell separator of the invention may be used as some or all of the plurality of separators in the fuel cell.

EXAMPLES

Examples of the invention and Comparative Examples are given below by way of illustration and not by way of limitation. The mean particle sizes are values measured using a particle size analyzer (Microtrac MT3000, available from Nikkiso Co., Ltd.).

Example 1

A fuel cell separator composition was prepared by charging a Henschel mixer with 100 parts by weight of natural graphite powder (mean particle size $d_{50}$=30 μm), a binder component consisting of 18.3 parts by weight of o-cresol novolak-type epoxy resin (epoxy equivalent weight, 199; ICI viscosity, 0.29 Pa·s; hydrolyzable chlorine content, 370 ppm), 9.6 parts by weight of novolak-type phenolic resin (hydroxyl group equivalent weight, 103; ICI viscosity, 0.22 Pa·s) and 0.19 part by weight of 2-phenylimidazole, and also with 0.5 part by weight of carnauba wax as an internal mold release agent, and mixing these ingredients together for 3 minutes at 500 rpm. The resulting composition was charged into a 300 mm×300 mm mold having ribs corresponding to gas flow channel grooves, and was compression-molded at a mold temperature of 180° C., a molding pressure of 29.4 MPa and a molding time of 2 minutes, thereby giving a plate-like molded article having gas flow channel grooves.

The entire surface of the resulting plate-like molded article was subjected to roughening treatment by wet blasting at a pressure of 0.25 MPa using an alumina abrasive grit having a mean particle size $d_{50}$ of 6 μm. Infrared laser irradiation treatment was subsequently applied under the following conditions: pulse energy, 10 mJ; power, 200 W; spot diameter, 300 μm; overlap ratio, 30%; wavelength, 1.064 μm. Next, using a remote-type atmospheric pressure glow discharge plasma treatment system (AP-T03, from Sekisui Chemical Co., Ltd.), the reaction faces were subjected to hydrophilizing treatment by atmospheric-pressure plasma treatment under the following conditions: frequency, 30 kHz; pulse width, 5 μs; plasma electrode width, 450 mm; distance between electrode contact areas of separator and plasma electrode, 1 mm; separator transport speed, 1,000 mm/min; nitrogen gas, 100 vol %; gas flow rate, 350 L/min. A fuel cell separator was thereby obtained.

Example 2

A fuel cell separator was obtained by the same method as in Example 1 except that, instead of carrying out atmospheric-pressure plasma treatment, hydrophilizing treatment by vacuum plasma treatment was carried out using a vacuum plasma treatment system (MT110-ST, from Nisshin KK) at a separator transport speed of 500 mm/min, a nitrogen gas concentration of 100 vol % and a gas flow rate of 200 L/min.

Example 3

A fuel cell separator was obtained by the same method as in Example 1 except that, instead of being subjected to atmospheric-pressure plasma treatment, the infrared laser irradiation treated plate-like molded article was placed in a 3,000 mL acid-resistant, pressure-resistant vessel heated to 50° C. and subjected to 15 minutes of hydrophilizing treatment at a flow rate of 5,000 mL/min using sulfur trioxide gas diluted 10-fold with nitrogen gas, then washed with an aqueous solution of sodium bicarbonate, additionally washed with ion-exchanged water, and dried.

Example 4

A fuel cell separator was obtained by the same method as in Example 1 except that, instead of being subjected to atmospheric-pressure plasma treatment, the infrared laser irradiation treated plate-like molded article was placed in a 3,000 mL vacuum vessel and the vessel interior was evacuated, after which the interior of the treatment vessel was flushed with nitrogen gas, in addition to which fluorine gas was supplied to the interior of the vessel so as to set the fluorine gas partial pressure within the treatment vessel to 30 kPa and the nitrogen gas partial pressure to 70 kPa, and hydrophilizing treatment was carried out at 25° C. for 15 minutes.

Comparative Example 1

Aside from not carrying out hydrophilizing treatment, a fuel cell separator was obtained by the same method as in Example 1.

Comparative Example 2

Aside from not carrying out infrared laser irradiation treatment, a fuel cell separator was obtained by the same method as in Example 1.

Comparative Example 3

Aside from not carrying out infrared laser irradiation treatment, a fuel cell separator was obtained by the same method as in Example 2.

Comparative Example 4

Aside from not carrying out infrared laser irradiation treatment, a fuel cell separator was obtained by the same method as in Example 3.

Comparative Example 5

Aside from not carrying out infrared laser irradiation treatment, a fuel cell separator was obtained by the same method as in Example 4.

Comparative Example 6

Aside from not carrying out roughening treatment, a fuel cell separator was obtained by the same method as in Example 1.

[Measurement of Surface Properties: Ra, RSm and S Values]

The surface properties of the molded article before infrared laser irradiation treatment were measured using a surface roughness tester (Surfcom 14000, from Tokyo Seimitsu Co., Ltd.) having a probe tip diameter of 5 μm. The arithmetic mean roughness Ra and the roughness curve element mean length RSm were measured in accordance with JIS B 0601-2001, and the mean interval S between local peaks was measured in accordance with JIS B 0601-1994.

[Measurement of Static Contact Angle]

Using a contact angle meter (model CA-DT-A, from Kyowa Interface Science Co., Ltd.), 5 μL of ion-exchanged water was deposited as a drop on the surface of a separator in each of states (1) to (3) below, and the static contact angle was measured. The results are shown in Table 1.

(1) Initial (one hour after production).
(2) Following 3,000 hours of atmospheric storage after production.
(3) Following removal of moisture from separator surface with a blower after taking separator out of water following 10,000 hours of immersion in 90° C. ion-exchanged water under the following condition: ion-exchanged water:separator=9:1 (weight ratio).

TABLE 1

| | Example | | | | Comparative Example | | | | | |
|---|---|---|---|---|---|---|---|---|---|---|
| | 1 | 2 | 3 | 4 | 1 | 2 | 3 | 4 | 5 | 6 |
| Roughening treatment | yes | yes | yes | yes | yes | yes | yes | yes | yes | no |
| Ra (μm) | 0.43 | 0.42 | 0.33 | 0.52 | 0.41 | 0.38 | 0.42 | 0.44 | 0.55 | 0.18 |
| RSm (μm) | 158 | 137 | 140 | 156 | 139 | 135 | 142 | 151 | 162 | 96 |
| S (μm) | 57 | 46 | 58 | 56 | 45 | 42 | 52 | 45 | 66 | 18 |
| Laser treatment | yes | yes | yes | yes | yes | no | no | no | no | yes |
| Hydrophilizing treatment | atmospheric-pressure plasma | vacuum plasma | sulfur trioxide gas | fluorine gas | none | atmospheric-pressure plasma | vacuum plasma | sulfur trioxide gas | fluorine gas | atmospheric-pressure plasma |
| Initial contact angle (°) | 10 | 12 | 10 | 10 | 31 | 10 | 16 | 10 | 10 | 10 |
| Contact angle (°) after 3,000 hours of atmospheric storage | 26 | 30 | 24 | 28 | 46 | 35 | 35 | 40 | 40 | 35 |
| Contact angle (°) after 10,000 hours immersion in 90° C. water | 20 | 26 | 24 | 20 | 40 | 40 | 40 | 42 | 40 | 40 |

As shown in Table 1, in Examples 1 to 4 in which roughening treatment, infrared laser irradiation treatment and hydrophilizing treatment were carried out, the static contact angle was from 10 to 12° initially, from 24 to 30° after 3,000 hours of atmospheric storage, and from 20 to 26° after 10,000 hours of immersion in 90° C. water, indicating that good hydrophilicity was maintained over a long period of time.

On the other hand, in Comparative Example 1 in which hydrophilizing treatment was not carried out, the initial static contact angle was 30° or more, indicating that the hydrophilicity was low compared to the examples of the invention. In Comparative Examples 2 to 5 in which infrared laser irradiation treatment was not carried out, the initial static contact angle was 10 to 16°, which was good. However, due to contamination by the binder component remaining on the surface layer of the separator, the contact angle after 3,000 hours of atmospheric storage was 35 to 40°, and the contact angle following 10,000 hours of immersion in 90° C. water was 40 to 42°. Hence, the hydrophilicity following the passage of a long period of time decreased. In Comparative Example 6 in which roughening treatment was not carried out, the initial static contact angle was 10°, which was good. However, due to contamination by soot that arose on the surface layer of the separator, the static contact angle after 3,000 hours of atmospheric storage was 35° and the static contact angle after 10,000 hours of immersion in 90° C. water was 40°. Here too, the hydrophilicity following the passage of a long period of time decreased.

The invention claimed is:

1. A fuel cell separator obtained by subjecting a surface of an article molded from a composition comprising a graphite powder, an epoxy resin and a phenolic resin to roughening treatment, followed by infrared laser irradiation treatment and, additionally, hydrophilizing treatment,
    wherein the fuel cell separator possesses characteristics (1) and (2) below:
    (1) an initial static contact angle of 20° or less; and
    (2) a static contact angle after 3,000 hours of atmospheric storage following production of 30° or less.

2. The fuel cell separator according to claim 1, further possessing characteristic (3) below:
    (3) a static contact angle after 10,000 hours of immersion in 90° C. ion-exchanged water of 30° or less.

3. The fuel cell separator according to claim 1, wherein the hydrophilizing treatment is sulfur trioxide gas treatment, fluorine gas treatment, vacuum plasma treatment or atmospheric-pressure plasma treatment.

4. The fuel cell separator according to claim 1, wherein the roughening treatment is blasting, barrel polishing or brush polishing.

5. The fuel cell separator according to claim 2, wherein the hydrophilizing treatment is sulfur trioxide gas treatment, fluorine gas treatment, vacuum plasma treatment or atmospheric-pressure plasma treatment.

6. The fuel cell separator according to claim 2, wherein the roughening treatment is blasting, barrel polishing or brush polishing.

7. The fuel cell separator according to claim 3, wherein the roughening treatment is blasting, barrel polishing or brush polishing.

8. The fuel cell separator according to claim 1 wherein the graphite powder has a mean particle size of 10 to 130 μm.

9. The fuel cell separator according to claim 1 wherein the roughening treatment on the molded article is carried out such that an arithmetic mean roughness Ra is 0.2 to 1.2 μm, a roughness curve element mean length RSm is 100 to 200 μm, and a mean interval S between local peaks is 20 to 80 μm.

10. The fuel cell separator according to claim 1 wherein the infrared laser irradiation treatment is carried out under the condition that the spot diameter of the infrared laser is from 50 to 800 μm.

11. The fuel cell separator according to claim 1 wherein the infrared laser irradiation treatment is carried out under the condition that the infrared laser overlap ratio is from 5 to 50%.

12. The fuel cell separator according to claim 1 wherein the atmospheric storage refers to storage in an environment at atmospheric pressure, a temperature of 25° C. and 50% relative humidity.

* * * * *